(12) United States Patent
Jeon et al.

(10) Patent No.: US 8,631,318 B2
(45) Date of Patent: Jan. 14, 2014

(54) ELECTRONIC DOCUMENT VERSIONING METHOD AND UPDATED DOCUMENT SUPPLY METHOD USING VERSION NUMBER BASED ON XML

(75) Inventors: Hye Jeong Jeon, Seoul (KR); Kyoung Ro Yoon, Seoul (KR); Bae Geun Kang, Gyounggi-do (KR)

(73) Assignee: LG Electronics, Inc., Seoul (KR)

( * ) Notice: Subject to any disclaimer, the term of this patent is extended or adjusted under 35 U.S.C. 154(b) by 474 days.

(21) Appl. No.: 12/359,142

(22) Filed: Jan. 23, 2009

(65) Prior Publication Data

US 2009/0157771 A1    Jun. 18, 2009

Related U.S. Application Data

(63) Continuation of application No. 10/705,915, filed on Nov. 13, 2003, now Pat. No. 7,484,171.

(51) Int. Cl.
G06F 17/27 (2006.01)
G06F 17/28 (2006.01)

(52) U.S. Cl.
USPC .......................................... 715/229; 715/232

(58) Field of Classification Search
USPC ....................................................... 715/229
See application file for complete search history.

(56) References Cited

U.S. PATENT DOCUMENTS

| | | | |
|---|---|---|---|
| 4,847,902 A | 7/1989 | Hampson | |
| 5,499,365 A | 3/1996 | Anderson et al. | |
| 5,553,216 A * | 9/1996 | Yoshioka et al. | 715/210 |
| 5,862,325 A | 1/1999 | Reed et al. | |
| 5,892,900 A | 4/1999 | Ginter et al. | |
| 6,088,717 A * | 7/2000 | Reed et al. | 709/201 |
| 6,161,145 A * | 12/2000 | Bainbridge et al. | 709/246 |
| 6,185,329 B1 | 2/2001 | Zhang et al. | |
| 6,473,794 B1 | 10/2002 | Guheen et al. | |
| 6,502,112 B1 | 12/2002 | Baisley | |
| 6,564,215 B1 * | 5/2003 | Hsiao et al. | 1/1 |
| 6,625,597 B1 * | 9/2003 | Yazdani | 1/1 |
| 6,635,089 B1 | 10/2003 | Burkett et al. | |
| 6,675,267 B2 | 1/2004 | Rovati | |
| 6,675,353 B1 | 1/2004 | Friedman | |
| 6,760,746 B1 | 7/2004 | Schneider | |

(Continued)

FOREIGN PATENT DOCUMENTS

| | | |
|---|---|---|
| EP | 0 384 184 A2 | 8/1990 |
| EP | 1 016 987 A2 | 7/2000 |

(Continued)

OTHER PUBLICATIONS

Hayashi et al., "Updating data dissemination methods for updating old replicas in ad hoc networks", Pers Ubiquit Comput, 2005, pp. 273-283.*

(Continued)

Primary Examiner — James J Debrow
(74) Attorney, Agent, or Firm — Sidley Austin LLP

(57) ABSTRACT

Methods and apparatus for versioning an electronic document based on XML and methods and apparatus for providing an updated electronic document based on XML can use a version value. The electronic document being managed can use a syntax defining a structure of the structured electronic document. One method is characterized in that date information of when a content of the electronic document is changed is used as a version value.

13 Claims, 18 Drawing Sheets

(56) References Cited

U.S. PATENT DOCUMENTS

| | | | |
|---|---|---|---|
| 6,847,977 B2 | 1/2005 | Abajian | |
| 6,873,693 B1 | 3/2005 | Langseth et al. | |
| 6,877,002 B2 | 4/2005 | Prince | |
| 6,904,454 B2 | 6/2005 | Stickler | |
| 6,912,529 B1 | 6/2005 | Kolfman | |
| 6,941,300 B2 | 9/2005 | Jensen-Grey | |
| 7,085,755 B2 | 8/2006 | Bluhm et al. | |
| 7,185,014 B1 * | 2/2007 | Hansen | 1/1 |
| 8,312,077 B2 * | 11/2012 | Gale et al. | 709/203 |
| 2002/0143976 A1 | 10/2002 | Barker et al. | |
| 2002/0152244 A1 | 10/2002 | Dean et al. | |
| 2002/0161890 A1 * | 10/2002 | Chen | 709/226 |
| 2003/0009472 A1 | 1/2003 | Azami et al. | |
| 2003/0097657 A1 * | 5/2003 | Zhou et al. | 725/46 |
| 2003/0196165 A1 | 10/2003 | Jung et al. | |
| 2003/0197733 A1 | 10/2003 | Beauchamp et al. | |
| 2003/0233241 A1 * | 12/2003 | Marsh | 705/1 |
| 2004/0015369 A1 | 1/2004 | Kim et al. | |
| 2004/0064481 A1 | 4/2004 | Azami | |
| 2004/0093331 A1 * | 5/2004 | Garner et al. | 707/3 |
| 2005/0177602 A1 * | 8/2005 | Kaler et al. | 707/104.1 |
| 2005/0193408 A1 | 9/2005 | Sull et al. | |
| 2005/0193425 A1 | 9/2005 | Sull et al. | |
| 2006/0156224 A1 * | 7/2006 | Sulistio et al. | 715/513 |

FOREIGN PATENT DOCUMENTS

| | | |
|---|---|---|
| EP | 1 126 707 A1 | 8/2001 |
| EP | 1126707 | 8/2001 |
| JP | 03-252868 | 11/1991 |
| JP | 9305622 | 11/1997 |
| JP | 11-224215 | 8/1999 |
| JP | 2000081999 | 3/2000 |
| JP | 2001-186497 | 7/2001 |
| JP | 2001-337833 | 12/2001 |
| KR | 1020020058639 A | 7/2002 |
| WO | WO 97/29591 | 8/1997 |
| WO | WO 01/52117 | 7/2001 |
| WO | WO 01/55900 A1 | 8/2001 |
| WO | WO 0195155 | 12/2001 |
| WO | WO 02/27520 A1 | 4/2002 |
| WO | WO 02/063494 A2 | 8/2002 |
| WO | WO 2004/045209 A1 | 5/2004 |

OTHER PUBLICATIONS

J. Robie, "Combining and Querying XML Data with SQL," Dec. 1999, pp. 1-14, from internet: http://www.infoloom.com/gcaconfs/WEB/philadelphia99/robie.HTM.

Chinese Office Action for Chinese Application No. 03819565.8(PCT/KR2003/001705), dated Jun. 22, 2007, 22 pages.

Canadian Office Action for Canadian Application No. 2,506,060, dated Jun. 6, 2007, 1 page.

European Search Report for Application No. EP 03811141, dated Oct. 10, 2005, 4 pages.

L. Ramaswamy, "Automatic Detection of Fragments in Dynamically Generated Web Pages," 2004, ACM, pp. 443-454.

Communication pursuant to Article 94(3) EPC for European Application 03 811 141.5, dated Jun. 15, 2010, 6 pages.

Hicks et al., "A Hypermedia Version Control Framework," ACM Transactions on Information Systems, vol. 16, No. 2, Apr. 1998, pp. 127-160.

Wong et al., "Managing and Querying Multi-Version XML Data with Update Logging," ACM, Nov. 2002, pp. 74-81.

Chien et al., "Efficient Schemes for Managing Multiversion XML Documents," Springer-Verlag 2002, Dec. 19, 2002, pp. 332-353.

Martinez et al., "A Method for the Dynamic Generation of Virtual Versions of Evolving Documents," ACM, 2002, pp. 476-482.

Chien et al., "XML Document Versioning," SIGMOD Record, vol. 30, No. 3, Sep. 2001, pp. 46-53.

Japanese Office Action and English Translation of same for Japanese Application No. 2009-074821, mailed Apr. 5, 2011, 10 pages.

English Translation of Korean Office Action for Korean Counterpart Application No. 10-2003-0025093, dated Jan. 20, 2006, 2 pages.

Japanese Notice of Allowance for Japanese Counterpart Application No. 2009-074821, dated May 15, 2012, 6 pages.

\* cited by examiner

Fig.7

```
<?xml version="1.0" encoding="UTF-8"?>
<!ELEMENT Programs (Version, Contents?, Broadcasts?)>
<!ELEMENT Contents (Version, Content+)>
<!ELEMENT Content (Version, Title, ProgramID, Synopsis?)>
<!ELEMENT Version (#PCDATA)>
<!ELEMENT Title (#PCDATA)>
<!ELEMENT ProgramID (#PCDATA)>
<!ELEMENT Synopsis (#PCDATA)>
<!ELEMENT Broadcasts (Version, Broadcasts+)>
<!ELEMENT Broadcast (Version, ProgramID, Time, Duration, Service?)>
<!ELEMENT Time (#PCDATA)>
<!ELEMENT Duration (#PCDATA)>
<!ELEMENT Service (#PCDATA)>
```

Fig.8

```xml
<?xml version="1.0" encoding="UTF-8" ?>
<schema targetNamespace="http://www.sbs.co.kr"
        xmlns="http://www.w3.org/2001/XMLSchema"
        elementFormDefault="unqualified">
  <import namespace="http://www.w3c.org/XML/1998/namespace"
          schemaLocation="./xml-1998.xsd" />
  <element name="Programs">
    <complexType> <sequence>
      <element name="Version" type="string">
      <element name="Contents" minOccurs="0">
        <complexType> <sequence>
          <element name="Version" type="string">
          <element name="Content" maxOccurs="unbounded">
            <complexType> <sequence>
              <element name="Version" type="string">
              <element name="Title"/>
              <element name="ProgramID"/>
              <element name="Synopsis" minOccurs="0">
            </sequence> </complexType> </element>
        </sequence> </complexType> </element>
      <element name="Broadcasts" minOccurs="0">
        <complexType> <sequence>
          <element name="Version" type="string">
          <element name="Broadcast" maxOccurs="unbounded">
            <complexType> <sequence>
              <element name="Version" type="string">
              <element name="ProgramID"/>
              <element name="Time" type="dateTime"/>
              <element name="Duration" type="dateTime"/>
              <element name="Service" minOccurs="0"/>
            </sequence> </complexType> </element>
        </sequence> </complexType> </element>
    </sequence> </complexType> </element>
</schema>
```

Fig.9

```xml
<?xml version="1.0" encoding="UTF-8" ?>
<Programs>
  <Version>20020407</Version>
  <Contents>
    <Version>20020407</Version>
    <Content>
      <Version>20020407</Version> <Title>Friends</Title>
      <ProgramID>KTLA-2002-0324</ProgramID> </Content>
    <Content>
      <Version>20020407</Version> <Title>Will & Grace</Title>
      <ProgramID>KTLA-2002-0391</ProgramID> </Content>
    <Content>
      <Version>20020407</Version> <Title>MAJOR LEAGUE BASEBALL</Title>
      <ProgramID>ESPN-2002-0114</ProgramID> </Content>
    <Content>
      <Version>20020407</Version> <Title> Sesame Street </Title>
      <ProgramID>KCET-2002-0115</ProgramID> </Content>
  </Contents>
  <Broadcasts>
    <Version>20020407</Version>
    <Broadcast>
      <Version>20020407</Version> <ProgramID>KTLA-2002-0324</ProgramID>
      <Time>2002-04-22 21:55</Time> <Duration>110m</Duration>
      <Service>KTLA</Service> </Broadcast>
    <Broadcast>
      <Version>20020407</Version> <ProgramID>KTLA-2002-0391</ProgramID>
      <Time>2002-04-29 21:55</Time> <Duration>70m</Duration>
      <Service>KTLA</Service> </Broadcast>
    <Broadcast>
      <Version>20020407</Version> <ProgramID>ESPN-2002-0114</ProgramID>
      <Time>2002-04-09 15:00</Time> <Duration>120m</Duration>
      <Service>ESPN</Service> </Broadcast>
    <Broadcast>
      <Version>20020407</Version> <ProgramID>KCET-2002-0115</ProgramID>
      <Time>2002-04-09 17:00</Time> <Duration>30m</Duration>
      <Service>KCET</Service> </Broadcast>
  </Broadcasts>
</Programs>
```

Fig.10

```xml
<?xml version="1.0" encoding="UTF-8" ?>
<Programs>
  <Version>20020407</Version>
  <Contents>
    <Version>20020407</Version>
    <Content>
      <Version>20020407</Version> <Title>Friends</Title>
      <ProgramID>KTLA-2002-0324</ProgramID> </Content>
    <Content>
      <Version>20020407</Version> <Title>Will & Grace</Title>
      <ProgramID>KTLA-2002-0391</ProgramID> </Content>
    <Content>
      <Version>20020407</Version> <Title> MAJOR LEAGUE BASEBALL </Title>
      <ProgramID>ESPN-2002-0114</ProgramID> </Content>
    <Content>
      <Version>20020407</Version> <Title>Sesame Street</Title>
      <ProgramID>KCET-2002-0115</ProgramID> </Content>
    <Content>
      <Version>20020408</Version> <Title>Larry King</Title>
      <ProgramID>CNN-2002-0394</ProgramID> </Content>
  </Contents>
  <Broadcasts>
  <Version>20020407</Version>
    <Broadcast>
      <Version>20020407</Version> <ProgramID>KTLA-2002-0324</ProgramID>
      <Time>2002-04-22 21:55</Time> <Duration>110m</Duration>
      <Service>KTLA</Service> </Broadcast>
    <Broadcast>
      <Version>20020407</Version> <ProgramID>KTLA-2002-0391</ProgramID>
      <Time>2002-04-29 21:55</Time> <Duration>70m</Duration>
      <Service>KTLA</Service> </Broadcast>
    <Broadcast>
      <Version>20020409</Version> <ProgramID>ESPN-2002-0114</ProgramID>
      <Time>2002-04-09 15:00</Time> <Duration>130m</Duration>
      <Service>ESPN</Service> </Broadcast>
    <Broadcast>
      <Version>20020409</Version> <ProgramID>KCET-2002-0115</ProgramID>
      <Time>2002-04-09 17:10</Time> <Duration>30m</Duration>
      <Service>KCET</Service> </Broadcast>
    <Broadcast>
      <Version>20020408</Version> <ProgramID>CNN-2002-0394</ProgramID>
      <Time>2002-04-19 00:55</Time> <Duration>60m</Duration>
      <Service>CNN</Service> </Broadcast>
  </Broadcasts>
</Programs>
```

Fig. 11

```xml
<?xml version="1.0" encoding="UTF-8" ?>
<Programs>
  <Version>20020409</Version>
  <Contents>
    <Version>20020409</Version>
    <Content>
      <Version>20020407</Version> <Title>Friends</Title>
      <ProgramID>KTLA-2002-0324</ProgramID> </Content>
    <Content>
      <Version>20020407</Version> <Title>Will & Grace</Title>
      <ProgramID>KTLA-2002-0391</ProgramID> </Content>
    <Content>
      <Version>20020407</Version> <Title> MAJOR LEAGUE BASEBALL </Title>
      <ProgramID>ESPN-2002-0114</ProgramID> </Content>
    <Content>
      <Version>20020407</Version> <Title>Sesame Street</Title>
      <ProgramID>KCET-2002-0115</ProgramID> </Content>
    <Content>
      <Version>20020408</Version> <Title>Larry King</Title>
      <ProgramID>CNN-2002-0394</ProgramID> </Content>
  </Contents>
  <Broadcasts>
    <Version>20020409</Version>
    <Broadcast>
      <Version>20020407</Version> <ProgramID>KTLA-2002-0324</ProgramID>
      <Time>2002-04-22 21:55</Time> <Duration>110m</Duration>
      <Service>KTLA</Service> </Broadcast>
    <Broadcast>
      <Version>20020407</Version> <ProgramID>LTLA-2002-0391</ProgramID>
      <Time>2002-04-29 21:55</Time> <Duration>70m</Duration>
      <Service>KTLA</Service> </Broadcast>
    <Broadcast>
      <Version>20020409</Version> <ProgramID>ESPN-2002-0114</ProgramID>
      <Time>2002-04-09 15:00</Time> <Duration>130m</Duration>
      <Service>ESPN</Service> </Broadcast>
    <Broadcast>
      <Version>20020409</Version> <ProgramID>KCET-2002-0115</ProgramID>
      <Time>2002-04-09 17:10</Time> <Duration>30m</Duration>
      <Service>KCET</Service> </Broadcast>
    <Broadcast>
      <Version>20020408</Version> <ProgramID>CNN-2002-0394</ProgramID>
      <Time>2002-04-19 00:55</Time> <Duration>60m</Duration>
      <Service>CNN</Service> </Broadcast>
  </Broadcasts>
</Programs>
```

Fig. 12

```xml
<?xml version="1.0" encoding="UTF-8" ?>
<Programs>
  <Version>20020409.3</Version>
  <Contents>
    <Version>20020409.1</Version>
    <Content>
      <Version>20020407</Version> <Title>Friends</Title>
      <ProgramID>KTLA-2002-0324</ProgramID> </Content>
    <Content>
      <Version>20020407</Version> <Title>Will & Grace</Title>
      <ProgramID>KTLA-2002-0391</ProgramID> </Content>
    <Content>
      <Version>20020407</Version> <Title> MAJOR LEAGUE BASEBALL </Title>
      <ProgramID>ESPN-2002-0114</ProgramID> </Content>
    <Content>
      <Version>20020407</Version> <Title>Sesame Street</Title>
      <ProgramID>KCET-2002-0115</ProgramID> </Content>
    <Content>
      <Version>20020408</Version> <Title>Larry King</Title>
      <ProgramID>CNN-2002-0394</ProgramID> </Content>
  </Contents>
  <Broadcasts>
    <Version>20020409.1</Version>
    <Broadcast>
      <Version>20020407</Version> <ProgramID>KTLA-2002-0324</ProgramID>
      <Time>2002-04-22 21:55</Time> <Duration>110m</Duration>
      <Service>KTLA</Service> </Broadcast>
    <Broadcast>
      <Version>20020407</Version> <ProgramID>KTLA-2002-0391</ProgramID>
      <Time>2002-04-29 21:55</Time> <Duration>70m</Duration>
      <Service>KTLA</Service> </Broadcast>
    <Broadcast>
      <Version>20020409</Version> <ProgramID>ESPN-2002-0114</ProgramID>
      <Time>2002-04-09 15:00</Time> <Duration>130m</Duration>
      <Service>ESPN</Service> </Broadcast>
    <Broadcast>
      <Version>20020409</Version> <ProgramID>KCET-2002-0115</ProgramID>
      <Time>2002-04-09 17:10</Time> <Duration>30m</Duration>
      <Service>KCET</Service> </Broadcast>
    <Broadcast>
      <Version>20020408</Version> <ProgramID>CNN-2002-0394</ProgramID>
      <Time>2002-04-19 00:55</Time> <Duration>60m</Duration>
      <Service>CNN</Service> </Broadcast>
  </Broadcasts>
</Programs>
```

Fig. 13

```xml
<?xml version="1.0" encoding="UTF-8" ?>
<Programs>
  <Version>20020407</Version>
  <Contents>
    <Version>20020407</Version>
    <Content>
      <Version>20020408</Version>
      <Title>Larry King</Title>
      <ProgramID>CNN-2002-0394</ProgramID>
    </Content>
  </Contents>
  <Broadcasts>
  <Version>20020407</Version>
    <Broadcast>
      <Version>20020409</Version>
      <ProgramID>ESPN-2002-0114</ProgramID>
      <Time>2002-04-09 15:00</Time>
      <Duration>130m</Duration>
      <Service>ESPN</Service>
    </Broadcast>
    <Broadcast>
      <Version>20020409</Version>
      <ProgramID>KCET-2002-0115</ProgramID>
      <Time>2002-04-09 17:10</Time>
      <Duration>30m</Duration>
      <Service>KCET</Service>
    </Broadcast>
    <Broadcast>
      <Version>20020408</Version>
      <ProgramID>CNN-2002-0394</ProgramID>
      <Time>2002-04-19 00:55</Time>
      <Duration>60m</Duration>
      <Service>CNN</Service>
    </Broadcast>
  </Broadcasts>
</Programs>
```

Fig.14

```xml
<?xml version="1.0" encoding="UTF-8" ?>
<Programs>
  <Version>20020409</Version>
  <Contents>
    <Version>20020409</Version>
    <Content>
      <Version>20020408</Version>
      <Title>Larry King</Title>
      <ProgramID>CNN-2002-0394</ProgramID>
    </Content>
  </Contents>
  <Broadcasts>
    <Version>20020409</Version>
    <Broadcast>
      <Version>20020409</Version>
      <ProgramID>ESPN-2002-0114</ProgramID>
      <Time>2002-04-09 15:00</Time>
      <Duration>130m</Duration>
      <Service>ESPN</Service>
    </Broadcast>
    <Broadcast>
      <Version>20020409</Version>
      <ProgramID>KCET-2002-0115</ProgramID>
      <Time>2002-04-09 17:10</Time>
      <Duration>30m</Duration>
      <Service>KCET</Service>
    </Broadcast>
    <Broadcast>
      <Version>20020408</Version>
      <ProgramID>CNN-2002-0394</ProgramID>
      <Time>2002-04-19 00:55</Time>
      <Duration>60m</Duration>
      <Service>CNN</Service>
    </Broadcast>
  </Broadcasts>
</Programs>
```

Fig.15

```
<?xml version="1.0" encoding="UTF-8" ?>
<Programs>
  <Version>20020407</Version>
  <Broadcasts>
  <Version>20020407</Version>
    <Broadcast>
      <Version>20020409</Version>
      <ProgramID>ESPN-2002-0114</ProgramID>
      <Time>2002-04-09 15:00</Time>
      <Duration>130m</Duration>
      <Service>ESPN</Service>
    </Broadcast>
    <Broadcast>
      <Version>20020409</Version>
      <ProgramID>KCET-2002-0115</ProgramID>
      <Time>2002-04-09 17:10</Time>
      <Duration>30m</Duration>
      <Service>KCET</Service>
    </Broadcast>
    <Broadcast>
      <Version>20020408</Version>
      <ProgramID>CNN-2002-0394</ProgramID>
      <Time>2002-04-19 00:55</Time>
      <Duration>60m</Duration>
      <Service>CNN</Service>
    </Broadcast>
  </Broadcasts>
</Programs>
```

Fig.16

```
<?xml version="1.0" encoding="UTF-8" ?>
<Programs>
  <Version>20020409</Version>
  <Broadcasts>
    <Version>20020409</Version>
    <Broadcast>
      <Version>20020409</Version>
      <ProgramID>ESPN-2002-0114</ProgramID>
      <Time>2002-04-09 15:00</Time>
      <Duration>130m</Duration>
      <Service>ESPN</Service>
    </Broadcast>
    <Broadcast>
      <Version>20020409</Version>
      <ProgramID>KCET-2002-0115</ProgramID>
      <Time>2002-04-09 17:10</Time>
      <Duration>30m</Duration>
      <Service>KCET</Service>
    </Broadcast>
    <Broadcast>
      <Version>20020408</Version>
      <ProgramID>CNN-2002-0394</ProgramID>
      <Time>2002-04-19 00:55</Time>
      <Duration>60m</Duration>
      <Service>CNN</Service>
    </Broadcast>
  </Broadcasts>
</Programs>
```

Fig. 17

```xml
<?xml version="1.0" encoding="UTF-8"?>
<Invalid>
   <Programs>
      <Broadcast>
         <Version>20020110</Version>
         <ProgramID>CNN-2002-0394</ProgramID>
      </Broadcast>
   </Programs>
</Invalid>
<Programs>
   <Version>20020407</Version>
   <Broadcasts>
   <Version>20020407</Version>
      <Broadcast>
         <Version>20020409</Version>
         <ProgramID>ESPN-2002-0114</ProgramID>
         <Time>2002-04-09 15:00</Time>
         <Duration>130m</Duration>
         <Service>ESPN</Service>
      </Broadcast>
      <Broadcast>
         <Version>20020409</Version>
         <ProgramID>KCET-2002-0115</ProgramID>
         <Time>2002-04-09 17:10</Time>
         <Duration>30m</Duration>
         <Service>KCET</Service>
      </Broadcast>
      <Broadcast>
         <Version>20020408</Version>
         <ProgramID>CNN-2002-0394</ProgramID>
         <Time>2002-04-19 00:55</Time>
         <Duration>60m</Duration>
         <Service>CNN</Service>
      </Broadcast>
   </Broadcasts>
</Programs>
```

Fig. 18

```
<?xml version="1.0" encoding="UTF-8"?>
<Invalid>
  <Programs>
    <Broadcast>
       <Version>20020110</Version>
       <ProgramID>CNN-2002-0394</ProgramID>
    </Broadcast>
  </Programs>
</Invalid>
<Programs>
  <Version>20020409</Version>
  <Broadcasts>
  <Version>20020409</Version>
    <Broadcast>
       <Version>20020409</Version>
       <ProgramID>ESPN-2002-0114</ProgramID>
       <Time>2002-04-09 15:00</Time>
       <Duration>130m</Duration>
       <Service>ESPN</Service>
    </Broadcast>
    <Broadcast>
       <Version>20020409</Version>
       <ProgramID>KCET-2002-0115</ProgramID>
       <Time>2002-04-09 17:10</Time>
       <Duration>30m</Duration>
       <Service>KCET</Service>
    </Broadcast>
    <Broadcast>
       <Version>20020408</Version>
       <ProgramID>CNN-2002-0394</ProgramID>
       <Time>2002-04-19 00:55</Time>
       <Duration>60m</Duration>
       <Service>CNN</Service>
    </Broadcast>
  </Broadcasts>
</Programs>
```

ELECTRONIC DOCUMENT VERSIONING METHOD AND UPDATED DOCUMENT SUPPLY METHOD USING VERSION NUMBER BASED ON XML

CROSS REFERENCE TO RELATED APPLICATION

The present application is a continuation of co-pending application Ser. No. 10/705,915, filed Nov. 13, 2003, the entirety of which is incorporated by reference herein.

BACKGROUND OF THE INVENTION

1. Field of the Invention

The present invention relates to an electronic document request/supply method, and more particularly, to an XML-based electronic document request/supply method.

2. Background of the Related Art

In recent years, an extensible markup language (hereinafter, referred to as "XML") is widely used to create electronic documents. The utilization of XML increases rapidly throughout the world, and government and public offices as well as general enterprises are increasingly introducing the XML. These electronic documents are generally created on the basis of a syntax prescribed by each organization.

XML-based electronic documents are often managed in a client/server structure that stores the documents in the server and provides desired electronic documents according to the user's request. Such a client/server structure is illustrated in FIG. 1.

FIG. 1 is a schematic view of the client/server structure that requests/supplies a general XML-based electronic document. As shown in FIG. 1, the client is a document requester/user side and the server is a document provider side. Accordingly, if a system requesting and using a document has functions of storing and providing the document at the same time, the system can simultaneously act as the client and the server according to its role.

A language fox searching XML documents includes XML query language (XQL) and XQuery. These search languages are widely used to search XML documents stored in an electronic document repository of the server and accept/provide a result in a form of XML document desired by the requester.

However, the related art XML electronic document request/supply methods and apparatus have various disadvantages. In a related art system that provides a document in accordance with a user's request, there does not exist a separate expression method for notifying only of the modified or added content of a document. Hence, in order to provide information on the modified or added content of the document, the related art system has a drawback in that it has to send the overall content of the document containing the repeated content (e.g., unchanged) which was initially sent.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an electronic document versioning method and/or document update transmission method based on XML using version numbers that substantially obviates one or more problems caused by limitations and disadvantages of the related art.

Another object of the present invention to provide an electronic document versioning method that enhances transmission efficiency of an electronic document transmission method on XML.

Another object of the present invention to provide an electronic document versioning method that is capable of gradual updating of an electronic document transmitted using XML.

Another object of the present invention to provide an electronic document versioning method in which at least one of date information and date with time information of a modified structure of the structured electronic document are used as version values.

Another object of the present invention is to provide an electronic document versioning method that is capable of changing a version value of a lower structure when the content of the lower structure is changed by correction or addition and capable of reflecting where such changes in a version value of a corresponding upper structure that includes the changed lower structure.

Another object of the present invention is to provide an electronic document versioning method that is capable of changing a version value of an upper structure so that the version value of the upper structure can determine the one or more corresponding lower structures that have changed.

Another object of the present invention is to provide an updated document supply method based on XML in which a provider sends not the overall content of the document but only the added or changed content by using a version value.

Another object of the present invention is to provide a document supply method based on XML in which identifier information on the electronic document can be used together with version values to distinguish the electronic document using the version values when the identifier information value is used again.

To achieve at least the above objects and other advantages in a whole or in part and in accordance with the purpose of the invention, as embodied and broadly described herein, there is provided a method for versioning an electronic document based on XML, the electronic document being managed using a syntax defining a structure of the structured electronic document, the method includes identifying a structure of an electronic document, and using date information of when a structure content of the electronic document is changed as a version value.

To further achieve the above objects and advantages in a whole or in part and in accordance with the present invention, there is provided a method for versioning an electronic document based on XML, the electronic document being managed using a syntax defining a structure of the structured electronic document, the method includes determining contents of an electronic document defined by the syntax, and using date and time information of when a content of the electronic document is changed as a version value.

To further achieve the above objects and advantages in a whole or in part and in accordance with the present invention, there is provided a method for requesting an electronic document based on XML, the electronic document being managed using a syntax defining a structure of the structured electronic document, the method includes identifying a version value of an electronic document, and requesting an updated information of the electronic document using the version value as a condition.

To further achieve the above objects and advantages in a whole or in part and in accordance with the present invention, there is provided a method for providing an updated electronic document based on XML, the electronic document being managed using a syntax defining a structure of the structured electronic document, the method includes identifying a version value of an electronic document, wherein the version value determines at least one of date and time information of a changed content of the electronic document, and providing an updated information of the electronic document using the version value as a condition.

To further achieve the above objects and advantages in a whole or in part and in accordance with the present invention, there is provided a method for processing an electronic document using a version based on XML, the electronic document being managed using a syntax defining a structure of the structured electronic document, the method includes providing an identifier for an electronic document, and providing a version value for the electronic document in which at least one of date information and date with time information of when a content of the electronic document is changed are used as the version value of the corresponding electronic document, wherein the version value is used to distinguish two electronic documents having the same identifier.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 7 is a diagram of an exemplary DTD showing a syntax of a broadcast program produced by an XML-based electronic document creating method to which an electronic document versioning method according to the present invention is applied;

FIG. 8 is a diagram of an exemplary XML schema showing a syntax of a broadcast program electronic document produced by an XML-based electronic document creating method to which an electronic document versioning method according to the present invention is applied;

FIG. 9 is a diagram of an exemplary broadcast program electronic document produced by an XML based electronic document creating method to which an electronic document versioning method according to the present invention is applied;

FIG. 10 is a diagram showing an exemplary current state program electronic document using a preferred embodiment of a method for versioning an XML-based electronic document according to the present invention;

FIG. 11 is a diagram showing an exemplary current state program electronic document using another preferred embodiment of a method for versioning an XML-based electronic document according to the present invention;

FIG. 12 is a diagram showing an exemplary current state program electronic document using yet another method for versioning an XML-based electronic document according to the present invention;

FIG. 13 is a diagram showing an exemplary updated electronic document provided according to 'request 1' in a system a using a preferred embodiment of a method for versioning an XML-based electronic document according to the present invention;

FIG. 14 is a diagram showing an exemplary updated electronic document provided according to 'request 1' in a system using additional preferred embodiments of methods for versioning an XML-based electronic document according to the present invention;

FIG. 15 is a diagram showing an exemplary updated electronic document provided according to 'request 2' in a system using a preferred embodiment of a method for versioning an XML-based electronic document according to the present invention;

FIG. 16 is a diagram showing an exemplary updated electronic document provided according to 'request 2' in a system using additional preferred embodiments of methods for versioning an XML-based electronic document according to the present invention;

FIG. 17 is a diagram showing an exemplary updated electronic document provided according to 'request 2' with an identifier and a system using a preferred embodiment of a method for versioning an XML-based electronic document according to the present invention; and FIG. 18 is a diagram showing an exemplary updated electronic document provided according to 'request 2' with a system using an identifier and additional preferred embodiments of methods for versioning an XML-based electronic document according to the present invention.

DETAILED DESCRIPTION OF PREFERRED EMBODIMENTS

Figure 1:
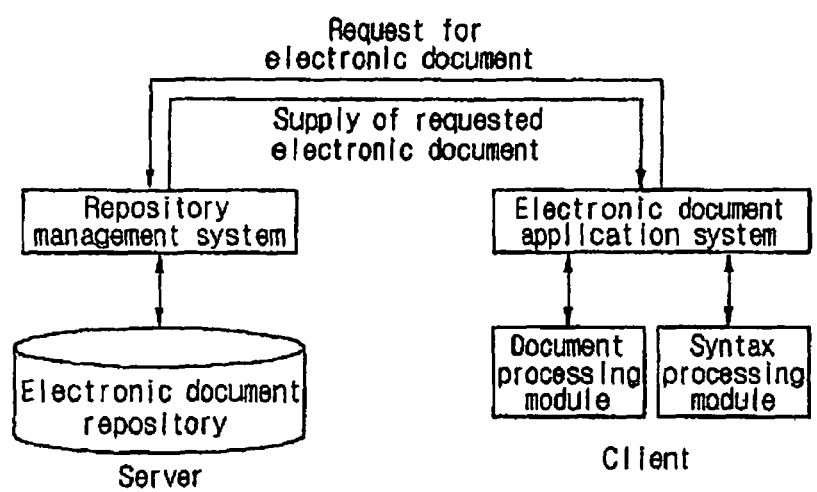
FIG. 1 is a schematic view of a related art client/server structure that requests/supplies an XML-based electronic document.

Embodiments of an electronic document versioning method and embodiments of a document supply method using a version number based on an XML according to the present invention will now be described. XML based electronic documents can define syntaxes using a document type definition (DTD) or an XML schema language. These syntaxes define a structure of an entire electronic document and restrict name and occurrence frequency of each element, order, whether it is an essential element or an optional element, attribute of each element, etc. The electronic documents become valid documents with respect to the syntaxes created by these languages. According to embodiments of the present invention, versions assigned to the electronic document can correspond to the element, attribute or the like.

Embodiments of the present invention disclose methods and apparatus whereby a provider can manage updated information of document depending on time using a prescribed version, element/attribute value of the syntax. Also according to embodiments of the present invention, a requester can request documents after a prescribed version value of a selected document provided to the requester from a repository. The requester intends to be supplied with the electronic documents after the version value so that the prescribed version value is used as a condition.

Further, an identifier of an electronic document is re-used later or after a certain time period. Embodiments according to the present invention can provide a way to identify a previous document having the identifier from a new or updated document.

Identifier information can be the only identification information capable of identifying a specific document. However, the range of the identifier information is limited. Accordingly, the identifier information is preferably orderly used from a first or minimum value. The life span of the allotted identifier value becomes a period in which all values in the identifier range (e.g., to the last or maximum value) are used.

In a case where the number of electronic documents is increased and thus the identifier information is used to the maximum value of its range, circulation is again repeated (e.g., continued re-using the identifier information) using the identifier information allotted to an invalid electronic document. In other words, an identifier value that is no longer valid as it reaches the identifier circulation period, can be again used in a new document.

Thus, there is a need of discrimination between an old document and a new document having the same identifier value for reasons such as document management and the like. It is possible to discriminate two such documents by the version value, for example using the latest correction date and time information, according to embodiments of the invention. That is, the two documents can be discriminated by using the latest correction date/time together.

Embodiments of XML-based electronic document request/supply method can be applied, for example, to systems including a requester who requests to be provided an electronic document, a provider that provides the requested electronic document, and a network coupled between the requester and the provider. Also, methods can be applied to a system that provides only a part of a basic information in an environment such as a broadcast program supply system, and then supplies updated information according to user's necessity or request.

Three methods for versioning an electronic document based on XML will now be described. However, the present invention is not intended to be so limited.

Figure 2:
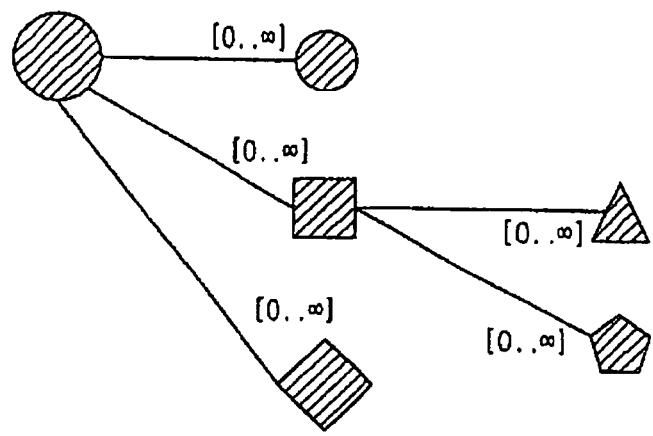
FIG. 2 is a diagram schematically showing an exemplary method of creating an XML-based electronic document.

FIG. 2 is a diagram schematically showing a general method of creating the XML-based electronic document. As shown in FIG. 2, each parenthesis is indicative of a number of lower structures that can be transited to upper structure. In order to consider all possible cases, it is assumed that zero (0) to infinity structures are respectively possible.

Figure 3:
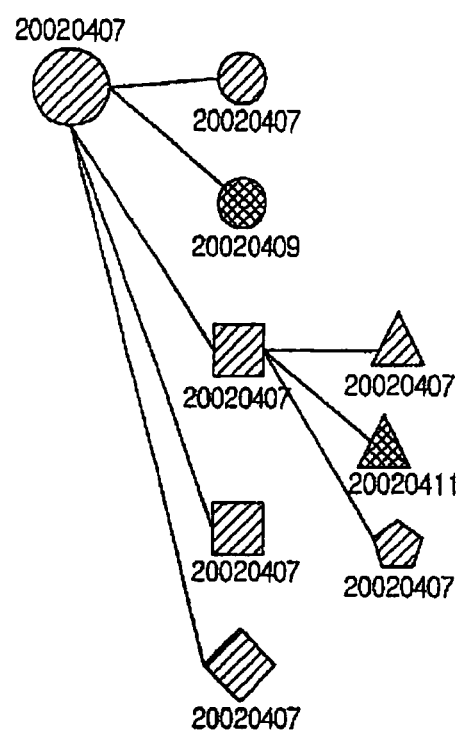
FIG. 3 is a diagram schematically showing a preferred embodiment of a method for versioning an XML-based electronic document according to the present invention.

A first embodiment of a method for versioning the electronic document based on XML according to the present invention uses date information at which content of document is added or corrected as a version value. Further, a value including the date with time information can be used as the version value, however, only the date information would be sufficient for the version value. FIG. 3 is a diagram showing the first embodiment of a method for versioning the XML-based electronic document used in FIG. 2 according to the present invention.

Figure 4:
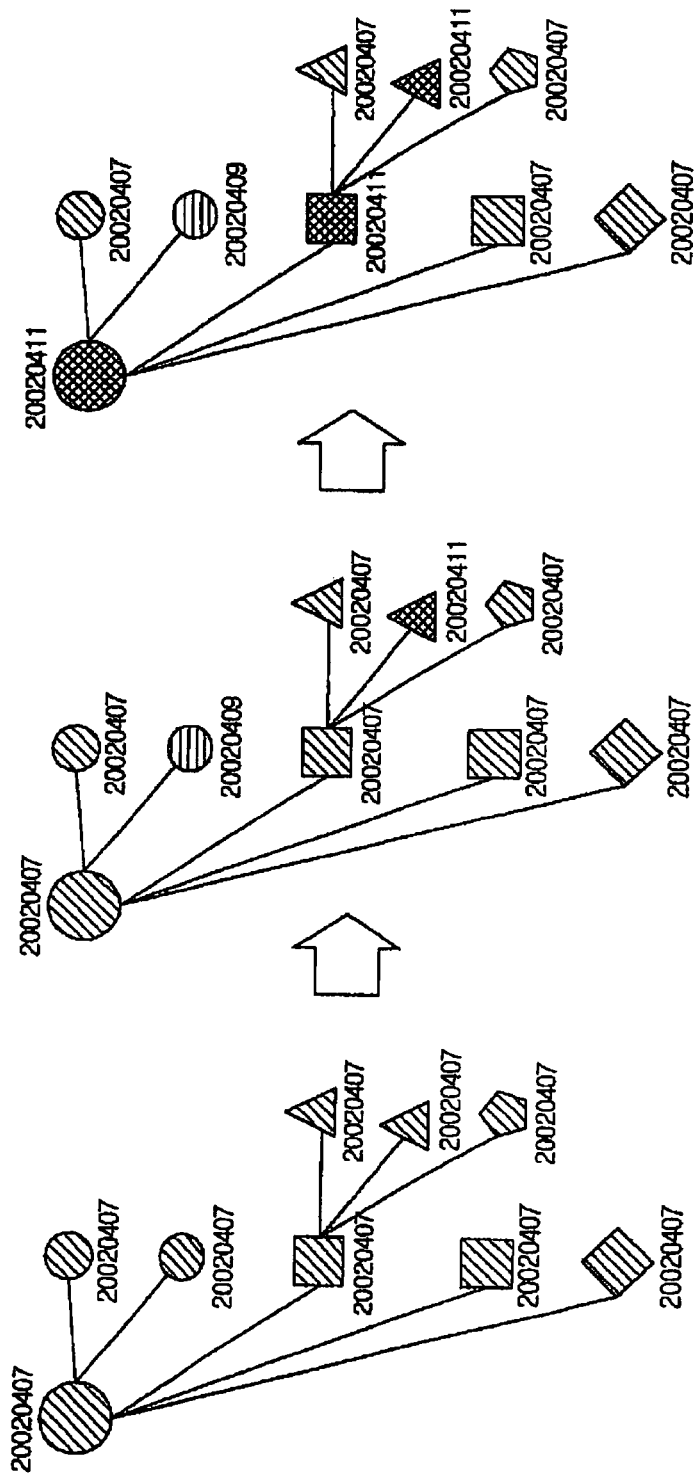
FIG. 4 is a diagram schematically showing another preferred embodiment of a method for versioning an XML-based electronic document according to the present invention.

A second embodiment of a method for versioning the electronic document based on XML according to the present invention, when a version value of lower structure is corrected, a version value of an upper structure is changed to the latest information (e.g., most recently changed) among the version values of corresponding lower structures. In the second embodiment of a method, the version value can be similar to the first embodiment of a method for versioning the electronic document based on XML. FIG. 4 is a diagram schematically showing the second embodiment of a method for versioning the XML-based electronic document of FIG. 2 according to the present invention. As shown in FIG. 4, the latest value among the version values of the lower structure becomes the version value of the upper structure.

Figure 5:
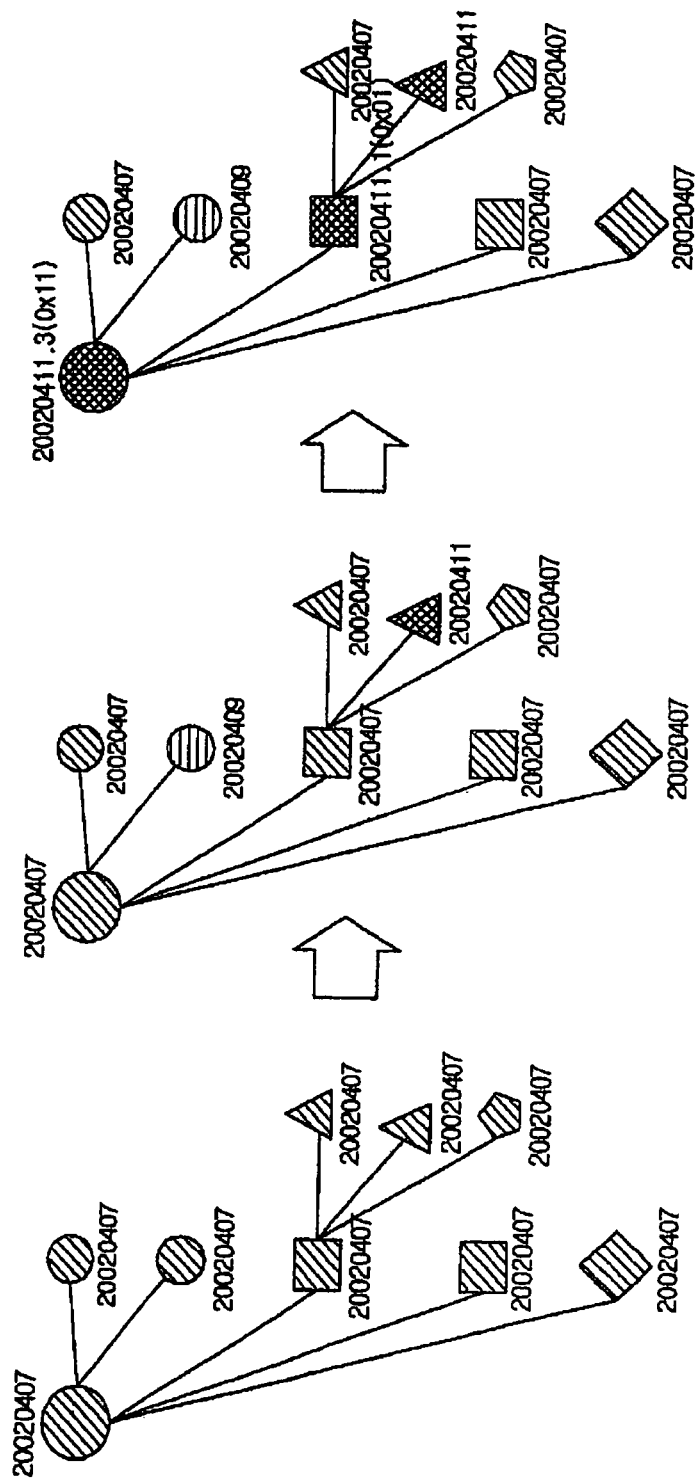
FIG. 5 is a diagram schematically showing yet another preferred embodiment of a method for versioning an XML-based electronic document according to the present invention.

According to a third embodiment of a method for versioning the electronic document based on XML according to the present invention, a version value of an upper structure indicates which (e.g., or whether an arbitrary type) lower structure is corrected or added. According to the third versioning method, if there are multiple lower structures, changed type can be easily or directly retrieved using version values to thereby decrease the retrieval time. In the third embodiment of a method, a version value can be similar to the second embodiment of a method for versioning the electronic document based on XML. FIG. 5 is a diagram schematically showing a third embodiment of a method for versioning the 334L-based electronic document of FIG. 2 according to the present invention.

For example, as shown in FIG. 5, a lower structure type can be expressed by a bit masking method using a bit masking value such as decimal or hexadecimal. However, the present invention is not intended to be so limited as other version values instead of bit masking values and others can be used that are sufficient to supplement the basic information such as the date information or date with time information with an identification of the possible corresponding lower structure types. Further, the provider can use the bit masking according to the third embodiment of a method for the purpose of inner management, and can provide a value except for the bit masking information as a version value when the provider provides a requester with a document or a requested document update.

Figure 6:
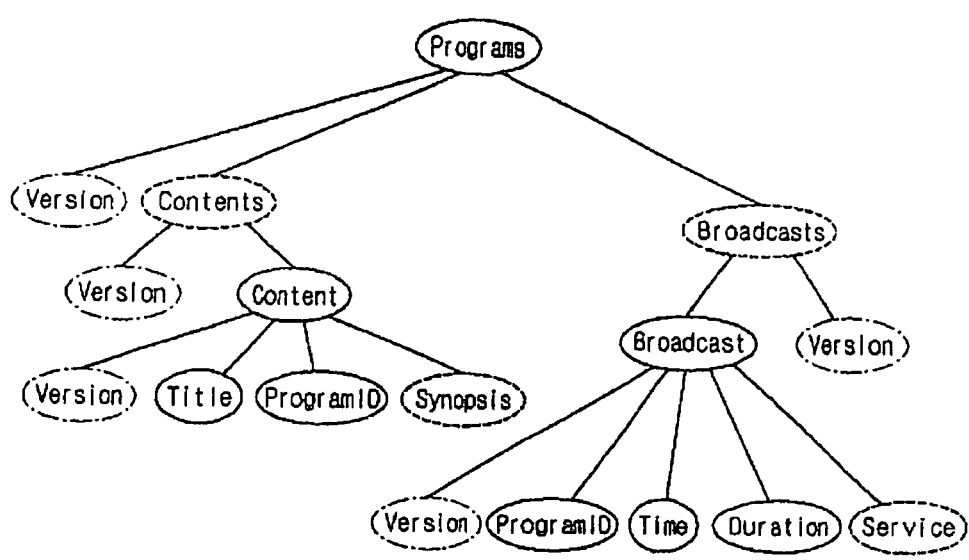
FIG. 6 is a diagram showing an exemplary syntax structure of a broadcast program produced by an XML-based electronic document creating method to which an electronic document versioning method according to the present invention is applied.

As one example application, the syntax of electronic document regarding a broadcast program is defined as follows, and application cases of an electronic document versioning method and an electronic document updating method based on XML will now be described. FIG. 6 is a diagram showing an exemplary syntax structure of a broadcast program created by the XML-based electronic document creating method to which embodiments of the electronic document versioning method according to the present invention is applied.

Broadcast programs can have information such as 'version', 'broadcast Contents' and 'broadcast schedules'. It is assumed that Broadcast contents' have a list on 'version' and 'broadcast content', and 'broadcast content' has information on program contents such as 'version', 'title', a sole 'program identifier' indicating program, synopsis and the like. In addition, it is assumed that 'broadcast schedules' have a list on 'version' and 'broadcast schedule', and 'broadcast schedule' has broadcast-related information such as 'version', a sole 'program identifier' indicating program, 'broadcast company', 'broadcast time', 'broadcast duration' and the like. Schema of these syntaxes is shown in FIG. 6.

Exemplary broadcast program syntaxes can be created as shown in FIGS. 7 and 8. FIG. 7 is a diagram showing an exemplary DTD showing the syntax of the broadcast program created by an XML-based electronic document creating method to which the electronic document versioning method according to embodiments of the present invention is applied, and FIG. 8 is a diagram showing an exemplary XML schema showing the syntax of a broadcast program electronic document produced by the XML-based electronic document creating method to which the electronic document versioning method according to embodiments of the present invention is applied.

The version value may use a type of 'dateTime' because it uses date information. However, the version value can be defined in a type of 'string', 'integer', 'float' and the like according to the versioning and the application supplied, and then can be type-converted into other types for use. In FIG. 8, the type of 'string' is used for the three electronic document versioning methods according embodiments of the present invention.

FIGS. 9, 10, 11 and 12 show the broadcast program documents substantially created depending upon these syntaxes, and show examples of the broadcast program electronic documents created by a XML-based electronic document creating method using the electronic document versioning method according to embodiments of the present invention. FIG. 9 is a diagram illustrating an exemplary initial document structure. FIGS. 10, 11 and 12 ate diagrams illustrating a current state document structure into which the document structure of FIG. 9 is respectively modified using three embodiments of electronic document versioning methods.

It is assumed that, after receiving program information of FIG. 9, the requester requests program information having the modified content up to a current requesting line by using the version value of FIG. 9. In the above circumstance, the requester can request all updated information using the version value ('request 1'), or can request only updated information for a specific structure 'broadcast schedule' ('request 2'). Such request conditions in each case for three embodiments of electronic document versioning methods can be as follows:

'request 1': 'version'≥20020407
'request 2': 'broadcast programs/broadcast schedules/broadcast schedule/version'≥20020407.

As shown in FIGS. 13, 14, 15 and 16, for 'request 1' and 'request 2', respectively, the electronic document repository can provide the electronic document application system used by the user, with the updated electronic document, according to the prescribed syntax.

For 'request 1', the updated electronic document provided by the first embodiment of the electronic document versioning method is shown in FIG. 13, and the updated electronic document provided by the second and third embodiments of the electronic document versioning methods is shown in FIG. 14. At this time, since the bit masking (e.g., modified lower structure selector) in the third electronic document versioning method is information that the provider can have internally, the electronic documents provided through the second and third embodiments of electronic document versioning methods can become identical with each other.

Further, for 'request 2', the updated electronic document provided through the first embodiment of electronic document versioning method is shown in FIG. 15. The updated electronic document provided through the second and third embodiments of electronic document versioning methods is shown in FIG. 16.

In a case where two programs coexist at almost same time because of the short life span of the identifier, there is a need for sending information that the previous program is not valid any more. In this case, by providing both of the version value and the identifier value of the invalid document, the requester can discriminate the invalid document having the consistent identifier value from the documents using the previous version values. Accordingly, the requester can use a new document having the identifier value identical with that of the previous document.

For 'request 2', FIGS. 17 and 18 show an example of the document with information on no-longer-valid programs being included in an element <invalid>. FIG. 17 is a diagram illustrating an example of the updated electronic document provided according to 'request 2' in a system using the first embodiment of electronic document versioning method based on XML and identifier according to the present invention. FIG. 18 is a diagram illustrating an example of the updated electronic document provided according to 'request 2' in a system using the second and third embodiments of electronic document versioning methods and the identifier according to the present invention.

In expressing a previous document having the identifier value 'CNN-2002-0394' of a newly added document to be no longer valid, the previous document is expressed by a version value of '20020110', which corresponds to a earlier (e.g., less) date than the latest modified date of the previous document or an initial creation date of the new document. Accordingly, so that the previous document can be discriminated from the new document having the same identifier value.

Thus, in electronic document versioning methods based on XML and the updated document supply method using the version according to embodiments of the present invention, only updated information among the contents information of the document is supplied, and the updated information is reflected on the documents, for example being used by the requester. Thus, it becomes possible to gradually update the document. Further, in a case where the identifier is reused, the version value based upon the embodiments of versioning methods of the invention can make it possible to discriminate between the new document and the previous document using the same identifier.

As described, embodiments of methods and apparatus for electronic document supply/request and transmission have various advantages. According to embodiments of XML-based electronic document versioning methods, a provider uses date and time information of modified structures as a version value in the provider's management on the structured electronic document so that the documents can be efficiently managed by using the version value. Further, according to embodiments of XML-based electronic document versioning methods, when the version value of the lower structure is changed by any correction or addition, the changed version value of the lower structure is reflected on the version value of the upper structure. Further, the modified or added lower structure can be retrieved by the version value. Also according to embodiments of electronic document versioning methods and updated document supply method using the version number based on the XML, since the provider separately transmits only contents that should be added or modified, an amount of transmission can be reduced and the requester can update the contents (e.g., only modified contents) of the previous document. In addition, according to embodiments of document supply methods using the version value based on the XML according to the present invention, when the identifier is reused, the new electronic document and the previous document having the same identifier can be discriminated using the version value.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method implemented by a client device for managing electronic documents including metadata related to broadcasting multimedia content, the method comprising:
   receiving an electronic document at the client device, the electronic document including metadata related to broadcasting multimedia content and having a defined structure including two or more structural elements, each of the two or more structural elements associated with a respective identifier and a respective version value representing a corresponding date;
   sending a request from the client device to a server for an update to the electronic document, wherein the request includes a first version value representing a first date;
   receiving an update document at the client device in response to the request, wherein the update document includes both updated information and invalidity information for the electronic document, wherein the updated information includes one or more structural elements updated after the first date, and the invalidity information includes a first identifier and a second version value representing a second date to indicate invalidity of a first structural element that has the first identifier and is associated with the second date, and wherein said first identifier is reused in the update to the electronic document for identifying a second structural element other than the first structural element; and
   processing the received invalidity information at the client device to identify the invalid first structural element based on the first identifier and the corresponding second version value.

2. The method of claim 1, further comprising:
   deleting the invalid first structural element at the client device.

3. The method of claim 1, wherein said electronic document is in XML format.

4. The method of claim 1, wherein the first version value and the second version value include a numerical representation of a corresponding calendar date.

5. The method of claim 4, wherein the numerical representation of the corresponding calendar date is expressed in the form of YYYYMMDD, wherein YYYY, MM, and DD are numerical expressions of year, month, and day, respectively.

6. A method implemented by a server for managing electronic documents including metadata related to broadcasting multimedia content, the method comprising:
   providing an electronic document to a client device, the electronic document including metadata related to broadcasting multimedia content and having a defined structure including two or more structural elements, each of the two or more structural elements associated with a respective identifier and a respective version value representing a corresponding date;
   receiving an update request including a first version value representing a first date from the client device for an update to the electronic document; and
   providing an update document to the client device in response to the update request, wherein the update document includes both updated information and invalidity information for the electronic document, wherein the updated information includes one or more structural elements updated after the first date, and the invalidity information includes a first identifier and a second version value representing a second date to indicate invalidity of a first structural element that has the first identifier and is associated with the second date, and wherein said first identifier is reused in the update to the electronic document for identifying a second structural element other than the first structural element.

7. The method of claim 6, wherein said electronic document is in XML format.

8. The method of claim 6, wherein the first version value and the second version value include a numerical representation of a corresponding calendar date.

9. The method of claim 8, wherein the numerical representation of the corresponding calendar date is expressed in the form of YYYYMMDD, wherein YYYY, MM, and DD are numerical expressions of year, month, and day, respectively.

10. A software product including instructions tangibly embodied in a non-transitory computer readable medium to cause a client device to perform operations for managing electronic documents including metadata related to broadcasting multimedia content, the operations comprising:
    receiving an electronic document at the client device, the electronic document including metadata related to broadcasting multimedia content and having a defined structure including two or more structural elements, each of the two or more structural elements associated with a respective identifier and a respective version value representing a corresponding date;
    sending a request from the client device to a server for an update to the electronic document, wherein the request includes a first version value representing a first date;
    receiving an update document at the client device in response to the request, wherein the update document includes both updated information and invalidity information for the electronic document, wherein the updated information includes one or more structural elements updated after the first date, and the invalidity information includes a first identifier and a second version value representing a second date to indicate invalidity of a first structural element that has the first identifier and is associated with the second date, and wherein the first identifier is reused in the update to the electronic document for identifying a second structural element other than the first structural element; and
    processing the received invalidity information at the client device to identify the invalid first structural element based on the first identifier and the corresponding second version value.

11. The software product of claim 10, wherein said electronic document is in XML format.

12. A software product including instructions tangibly embodied in a non-transitory computer readable medium to cause a server to perform operations for managing electronic documents including metadata related to broadcasting multimedia content, the operations comprising:
    providing an electronic document to a client device, the electronic document including metadata related to broadcasting multimedia content and having a defined structure including two or more structural elements, each of the two or more structural elements associated with a respective identifier and a respective version value representing a corresponding date;
    receiving an update request including a first version value representing a first date from the client device for an update to the electronic document; and
    providing an update document to the client device in response to the update request, wherein the update document includes both updated information and invalidity information for the electronic document, wherein the updated information includes one or more structural elements updated after the first date, and the invalidity information includes a first identifier and a second version value representing a second date to indicate invalidity of a first structural element that has the first identifier and is associated with the second date, and wherein the first identifier is reused in the update to the electronic document for identifying a second structural element other than the first structural element.

13. The software product of claim 12, wherein said electronic document is in XML format.

* * * * *